US009528311B1

(12) United States Patent
Hager

(10) Patent No.: US 9,528,311 B1
(45) Date of Patent: Dec. 27, 2016

(54) THERMAL RELEASE OF A SELF-OPENING COVER

(71) Applicant: Exelis, Inc., McLean, VA (US)

(72) Inventor: Mark Alan Hager, West Henrietta, NY (US)

(73) Assignee: Exelis, Inc., McLean, VA (US)

( * ) Notice: Subject to any disclaimer, the term of this patent is extended or adjusted under 35 U.S.C. 154(b) by 0 days.

(21) Appl. No.: 14/688,631

(22) Filed: Apr. 16, 2015

(51) Int. Cl.
  E05F 15/60 (2015.01)
  A47B 96/20 (2006.01)
  E05F 1/10 (2006.01)
  E06B 3/38 (2006.01)
  E06B 5/00 (2006.01)
  E06B 7/16 (2006.01)

(52) U.S. Cl.
  CPC ............ E05F 15/60 (2015.01); A47B 96/20 (2013.01); E05F 1/105 (2013.01); E06B 3/385 (2013.01); E06B 5/006 (2013.01); E06B 7/16 (2013.01); E05Y 2201/474 (2013.01); E05Y 2400/44 (2013.01); E05Y 2400/61 (2013.01); E05Y 2900/60 (2013.01)

(58) Field of Classification Search
  CPC .......... E05F 15/60; A47B 96/20; E06B 3/385; E06B 7/16; E06B 5/006; E05Y 2400/44; E05Y 2400/61
  USPC ......... 49/1, 2, 7, 8; 70/465; 292/DIG. 65, 66
  See application file for complete search history.

(56) References Cited

U.S. PATENT DOCUMENTS

| 4,714,285 | A | * | 12/1987 | Langham | 292/163 |
| 4,809,760 | A | | 3/1989 | Lew | |
| 7,500,704 | B2 | * | 3/2009 | Herrera et al. | 296/37.12 |
| 2007/0063540 | A1 | * | 3/2007 | Browne et al. | 296/180 |
| 2007/0063544 | A1 | * | 3/2007 | Browne et al. | 296/187.09 |
| 2008/0100092 | A1 | * | 5/2008 | Gao et al. | 296/146.11 |

* cited by examiner

Primary Examiner — Jerry Redman
(74) Attorney, Agent, or Firm — Edell, Shapiro & Finnan LLC

(57) ABSTRACT

A cover is fitted to an aperture in an enclosure. A biasing mechanism is connected to the cover to mechanically bias the cover in an open position. An adhesive member is disposed around the aperture to retain the cover in a closed position against the bias of the biasing mechanism. A release mechanism effects release of the cover from the adhesive member by diminishing adhesion thereof in response to an open command signal.

8 Claims, 6 Drawing Sheets

THERMAL RELEASE OF A SELF-OPENING COVER

TECHNICAL FIELD

The present disclosure relates to opening mechanisms of aperture covers and doors.

BACKGROUND

Many satellites and other systems have one or more covers or doors to protect internal mechanisms, e.g., optics, sensors and sensitive machinery during transport or other periods of disuse. These types of doors utilize various mechanisms, such as mechanical launch locks to hold them in a closed position and motors to open them. Motors and the control circuitry by which they are operated are expensive to design, procure, manufacture and test. In some applications, such as space-based systems, testing typically includes a life cycle test which could take months to complete. Additional items that drive cost in such space-based systems include the launch lock, the control/telemetry electronics, the drive motor, the gear box, as well as vacuum compatible bearings and grease. Research and development efforts that seek to simplify cover/door mechanisms, and to reduce cost accordingly, are ongoing.

SUMMARY

A cover is fitted to an aperture in an enclosure. A biasing mechanism is connected to the cover to mechanically bias the cover in an open position. An adhesive member is disposed around the aperture to retain the cover in a closed position against the bias of the biasing mechanism. A release mechanism effects release of the cover from the adhesive member by diminishing adhesion thereof in response to an open command signal.

DESCRIPTION OF EXAMPLE EMBODIMENTS

Figure 1A:
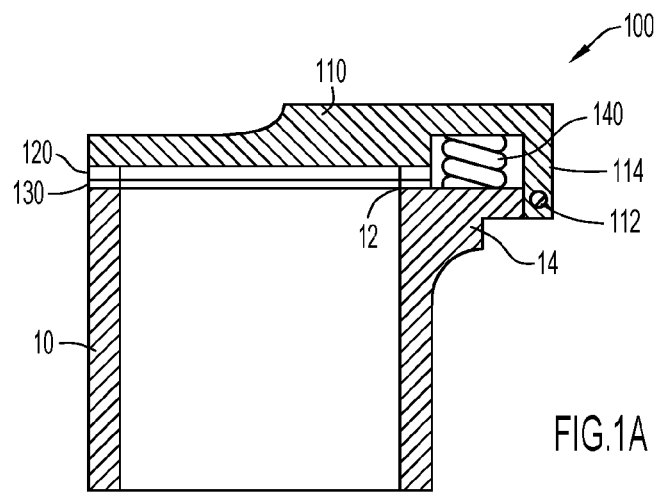
FIGS. 1A-1C illustrate a cover mechanism that can be used in conjunction with embodiments of the present general inventive concept

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

Figure 1B:
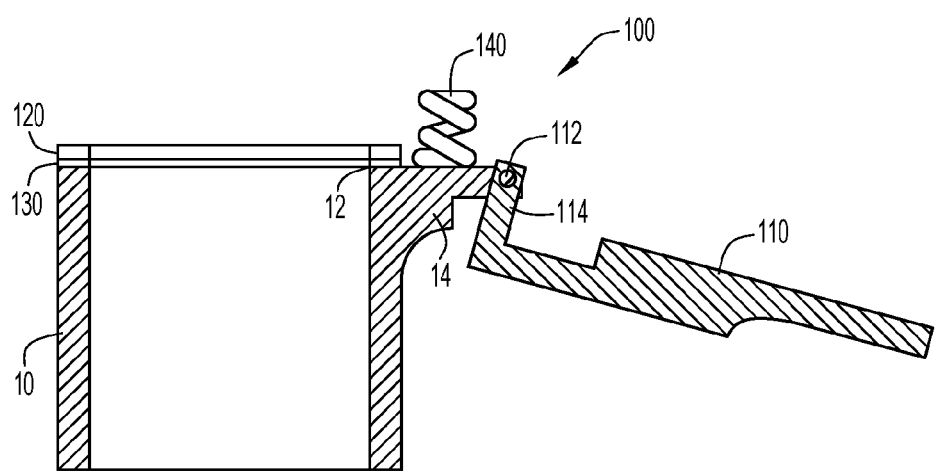
Figure 1C:
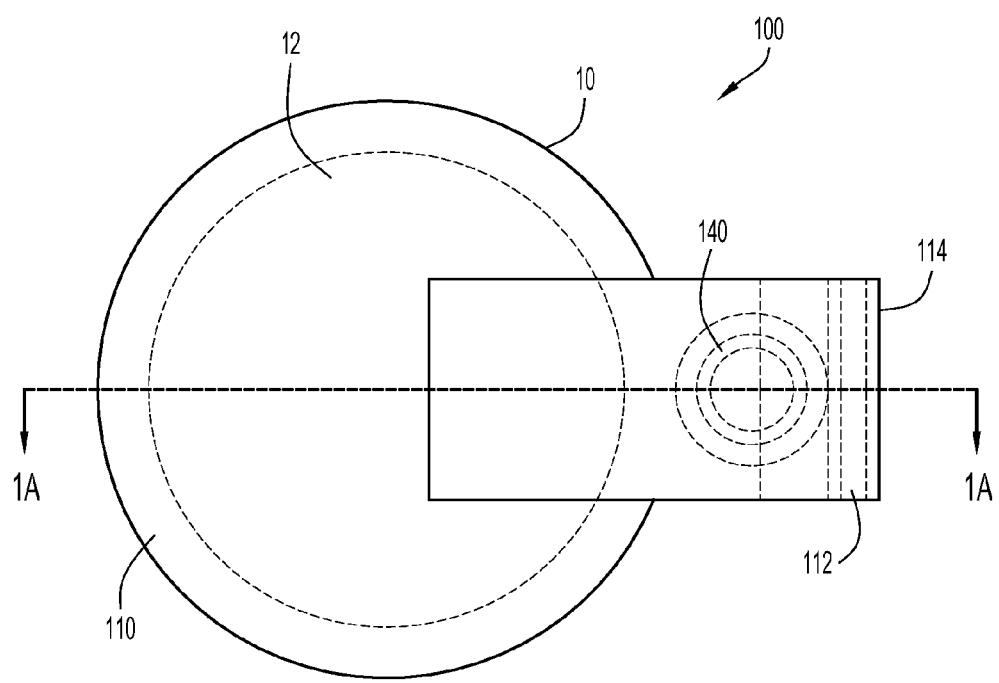

FIGS. 1A-1C, collectively referred to herein as FIG. 1, illustrate an exemplary cover mechanism 100 in which the present invention is embodied; FIG. 1A depicts cover mechanism 100 in a closed configuration, FIG. 1B depicts cover mechanism 100 in an open configuration and FIG. 1C depicts cover mechanism 100 from an overhead perspective. Cover mechanism 100 includes a cover 110 constructed or otherwise configured to cover an aperture 12 of an equipment housing 10. The present invention is not limited to particular equipment housings or to the type of equipment that might be enclosed therein. Upon review of this disclosure, those having skill in various fields of endeavor will recognize numerous applications in which the present invention can be embodied without departing from the spirit and intended scope thereof.

Cover 110 may be mechanically coupled to housing 10 by various conventional mechanisms. In certain embodiments, cover 110 is attached via a hinge pin 112 extending through cover 110 and housing 10. Each of housing 10 and cover 110 may include structural extensions 14 and 114, respectively, joined one to another by hinge pin 112 so that cover 110 properly seats on housing 10. By way of hinge pin 112, cover 110 is selectively placed in the closed and open configurations respectively illustrated in FIGS. 1A and 1B.

Cover mechanism 100 may include a biasing mechanism, such as compression spring 140 that biases cover 110 in an open position. The present invention is not limited to particular biasing mechanisms; other mechanisms such as springs, elastic rods and bands, shape memory materials, etc., may be used in embodiments of the present invention without departing from the spirit and intended scope thereof. Those having skill in the mechanical arts will recognize the manner in which such biasing mechanisms may be incorporated into various housings per the requirements of the applications in which the present invention is embodied.

Cover mechanism 100 may include an adhesive member 120 disposed around aperture 12 to retain cover 110 in the closed position. Adhesive member 120 may be formed of an adhesive of predetermined and well-understood adhesive properties. Accordingly, the adhesion force realized between adhesive member 120 and aperture 12 is sufficient to overcome not only the biasing force of biasing mechanism 140, but also other forces that may be imparted to housing 10 while cover 110 is under that biasing force, such as those encountered during transport. In certain embodiments, adhesive member 120 forms a hermetic seal around aperture 12. When so embodied, the interior of housing 10 can retain a purging gas, such as nitrogen, although the present invention is not so limited.

Exemplary cover mechanism 100 includes a release mechanism 130 disposed around aperture 12 in thermal contact with adhesive member 120. In certain embodiments, release mechanism 130 comprises one or more heating elements that provide heat to adhesive member 120 and to consequently decrease the adhesion between cover 110 and aperture 12. It is to be understood that while release mechanism 130 is illustrated as a separate layer in FIG. 1, such is for purposes of explanation and not limitation. In certain embodiments, release mechanism 130 is implemented by heating elements embedded within the material from which aperture 12 is formed, e.g., the material from which housing 10 is formed.

Under the influence of heat applied by release mechanism 130, the adhesion of adhesive member 120 weakens and is eventually overcome by the biasing force of compression spring 140. When such occurs, cover 110 will be compelled into its open position illustrated in FIG. 1B. In certain embodiments, a latch or detent (not illustrated) may be installed to retain cover 110 in the open position and/or to prevent recoil of cover 110 back towards aperture 12.

Figure 2A:
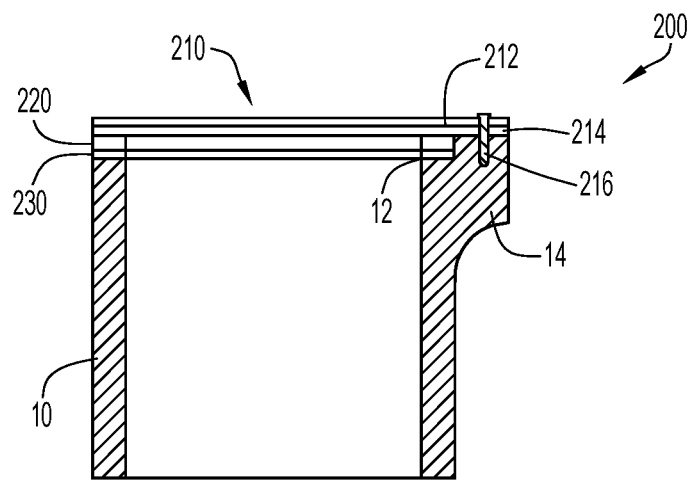
FIGS. 2A-2C illustrate another cover mechanism that can be used in conjunction with embodiments of the present general inventive concept
Figure 2B:
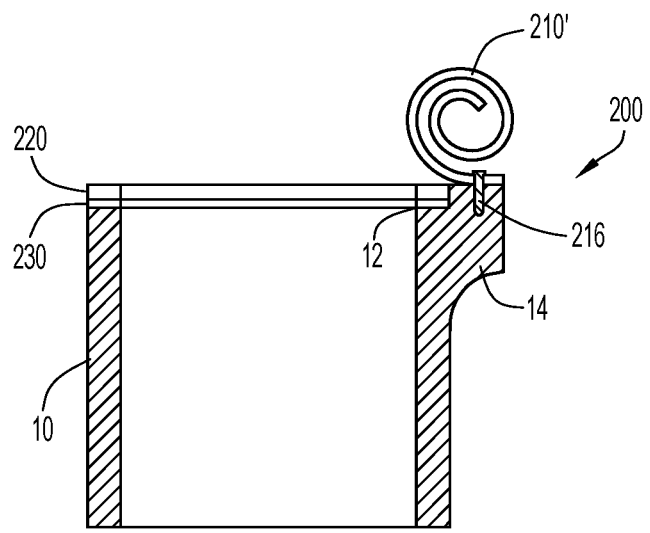
Figure 2C:
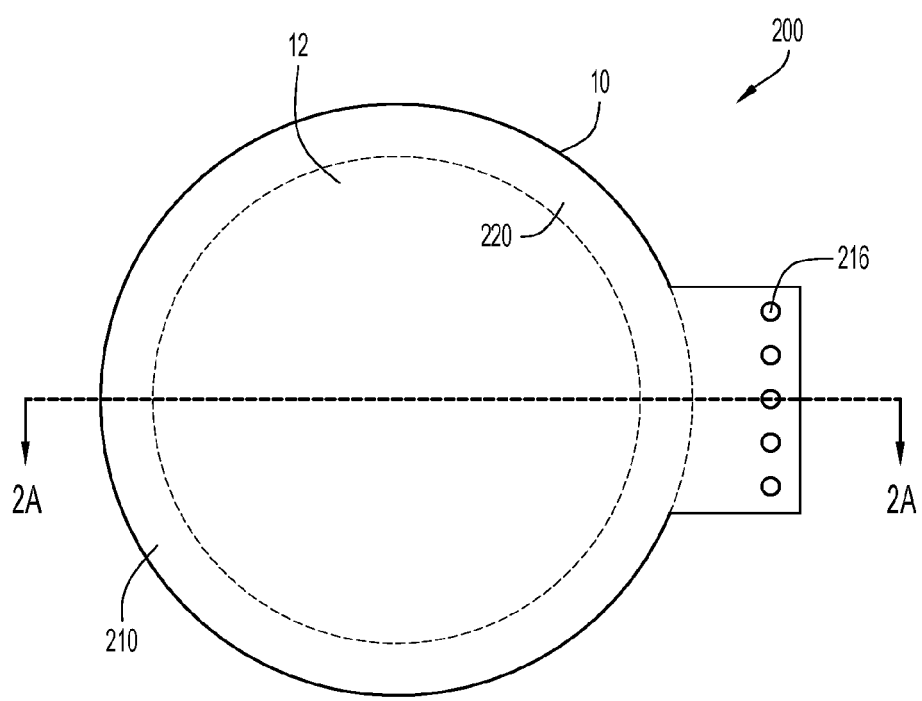

FIGS. 2A-2C, collectively referred to herein as FIG. 2, illustrate another cover mechanism 200 that can be used in conjunction with embodiments of the present general inventive concept. Similarly to cover mechanism 100, cover mechanism 200 includes an adhesive member 220 and a release mechanism 230, which may be implemented identically to adhesive member 120 and a release mechanism 130 of FIG. 1. Cover 210 may comprise a flexible member 214 with an embedded biasing member 212, such as a coiling spring, attached at housing extension 14 by a suitable fastener 216, such as one or more screws. That is, the natural, zero-storage state of biasing member 212 is a coil, such as illustrated in FIG. 2B, and the energy storage state is achieved by uncoiling biasing member 212. In an alternative embodiment, cover 210 and biasing member 214 are in unitary construction, such as by a shape memory material, as illustrated by cover 210'. In either implementation, the biasing force is overcome by adhesive member 220 to retain cover 210/210' in a closed position. In a manner similar to that described above, cover mechanism 200 is compelled into its open configuration, i.e., that illustrated in FIG. 2, by activating release mechanism 230, e.g., applying heat to adhesive member 230.

Figure 3:
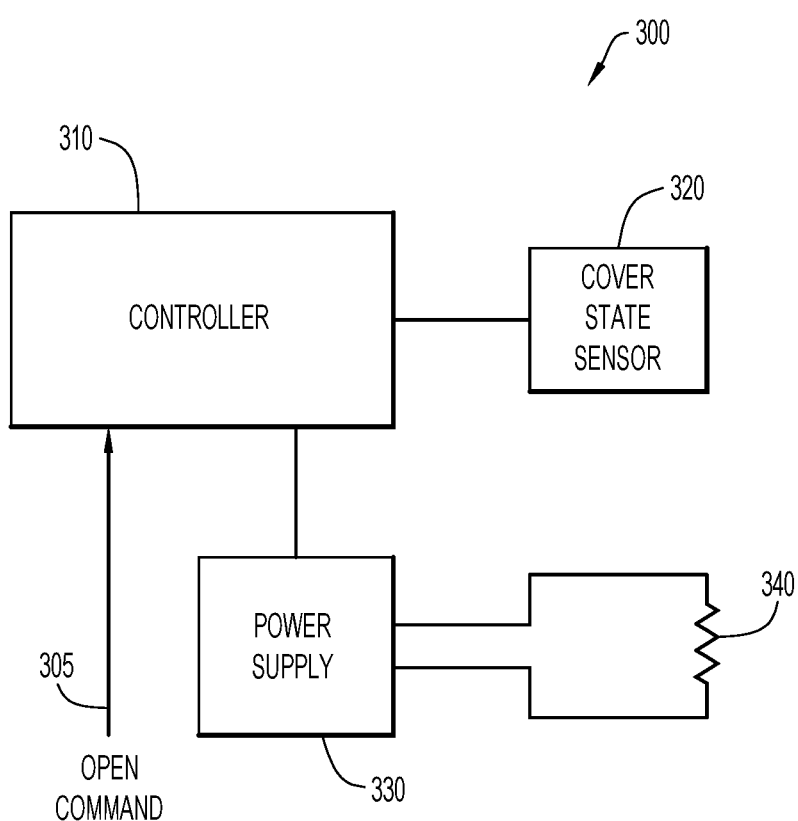
FIG. 3 is a schematic block diagram of a cover control mechanism that can be used in conjunction with embodiments of the present general inventive concept.

FIG. 3 is a schematic block diagram of an exemplary control circuit 300 that can be used in conjunction with the present invention. Central to control circuit 300 is a controller 310, which can be implemented by a suitable microcontroller or microprocessor and associated support circuits, such as memory, input/output, communication transceivers, etc. Those having skill in the pertinent art will recognize numerous control/processing and support circuitry that can used in embodiments of the present invention without departing from the spirit and intended scope thereof.

Control circuit 300 may include a power supply 330 to provide operating power for a release mechanism, e.g., heating element 340. In certain embodiments, the output power of power supply 330 may be variable under controller 310 and, accordingly, the temperature of heating element 340 can be controlled. That is, heating element 340 may selected by its voltage-to-heat response curve that corresponds with the adhesion-to-temperature response curve of the adhesive member being utilized, and the voltage output of power supply 330 can thus control the adhesion of the adhesive member.

Control circuit 300 may include a cover state sensor 320 to indicate whether the cover is in the open or closed position. Cover state sensor 320 may be implemented by a suitable switch circuit or the like that provides a signal to controller 310 indicative of the cover state. Upon receipt of an open command 305, controller 310 may activate heating element 340 through variable power supply 330 and, if the cover fails to open, as indicated by cover state sensor 320, controller 310 can compel power supply 310 to increase the supply voltage on heating element 340.

Figure 4:
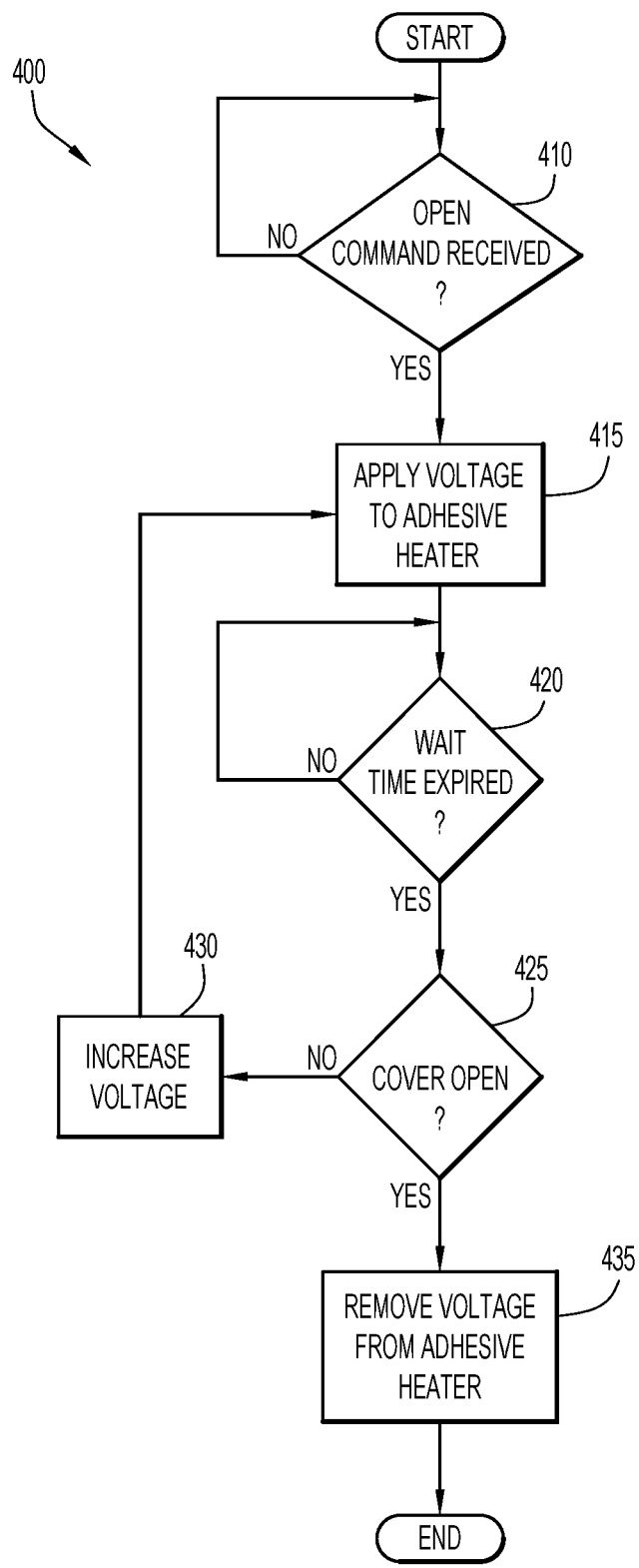
FIG. 4 is a flow diagram of a cover control process that can be used in conjunction with embodiments of the present general inventive concept.

FIG. 4 is a flow diagram of an exemplary cover mechanism control process 400 that can be used in conjunction with embodiments of the present invention. Control process 400 may be realized in hardware, software or a combination thereof. For example, control process 400 may be implemented by suitably programmed processor-executable instructions executed on controller 310.

In operation 410, it is determined whether an open command has been received by controller 310. If not, control process 400 may enter a loop that awaits such open command. When an open command is received, as determined by operation 410, control process 400 may transition to operation 415 by which a voltage is applied to adhesive heater 340. Control process 400 may then enter a wait period, as illustrated by operation 420 and associated loop, at the end of which it is determined whether the cover is in its open position, as indicated to by cover state sensor 320. If the cover has failed to open, as determined in operation 425, control process 400 may transition to operation 430 by which the output voltage of power supply 330 is increased. Control process 400 may return to operation 415 and continue from that point in another attempt to open the cover. If, however, the cover is found to be in the open position, as determined in operation 425, control process 400 may transition to operation 435, by which the operating voltage is removed from adhesive heater 340 and the process terminates.

Embodiments of the present invention provide a highly reliable aperture cover in that the cover apparatus is assembled from mechanisms that are simpler and fewer in number than their conventional counterparts.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A cover apparatus for an enclosure comprising:
    a cover to extend over an aperture in the enclosure when in a closed position and to expose the aperture when in an open position;
    a biasing mechanism connected to the cover to mechanically bias the cover in the open position, wherein the cover and the biasing mechanism are constructed from identical material and in unitary formation such that the cover coils upon itself in the open position and is uncoiled in the closed position over the aperture in the enclosure;
    an adhesive member disposed around the aperture to retain the cover in the closed position against the bias of the biasing mechanism; and a release mechanism to effect release of the cover from the adhesive member by diminishing adhesion thereof in response to an open command signal.

2. The cover apparatus of claim 1, wherein the release device includes a heating element.

3. The cover apparatus of claim 2, wherein the adhesive member includes a heat deactivated adhesive.

4. The cover apparatus of claim 1, wherein the cover is constructed from a rigid material.

5. The cover apparatus of claim 1, wherein the cover is constructed from a flexible material and the biasing mechanism includes a curling spring embedded in the flexible cover.

6. The cover apparatus of claim 1, further comprising:
a cover state sensor to generate a signal indicative of whether the cover is in the open position or in the closed position; and
a controller to establish a voltage level applied to the release mechanism based on the signal from the cover state sensor.

7. The cover apparatus of claim 6, further comprising:
a power supply to provide electrical power to the release mechanism at the voltage level established by the controller.

8. The cover apparatus of claim 1, wherein the adhesive member forms a hermetic seal between the cover and the aperture.

\* \* \* \* \*